United States Patent [19]

Iwao

[11] Patent Number: 4,799,151
[45] Date of Patent: Jan. 17, 1989

[54] MICROPROGRAM CONTROL CIRCUIT

[75] Inventor: Toshio Iwao, Tokyo, Japan

[73] Assignee: Kabushiki Kaisha Toshiba, Kawasaki, Japan

[21] Appl. No.: 942,785

[22] Filed: Dec. 17, 1986

[30] Foreign Application Priority Data

Dec. 20, 1985 [JP] Japan .................................. 60-286934

[51] Int. Cl.⁴ ............................................... G06F 9/22
[52] U.S. Cl. ..................................................... 364/200
[58] Field of Search ... 364/200 MS File, 900 MS File

[56] References Cited
U.S. PATENT DOCUMENTS
4,399,507 8/1983 Cosgrove et al. ................. 364/200

Primary Examiner—Raulfe B. Zache
Attorney, Agent, or Firm—Finnegan, Henderson, Farabow, Garrett, & Dunner

[57] ABSTRACT

An address designation field is provided in a return instruction. An offset value from the return address in a main program is designated in the address designation field. An adder adds the return address in the main program, which is stored in the stack, and the offset value designated in the return instruction. The addition result is supplied to a control storage as the designation address of the next instruction to be executed.

3 Claims, 5 Drawing Sheets

F I G. 4
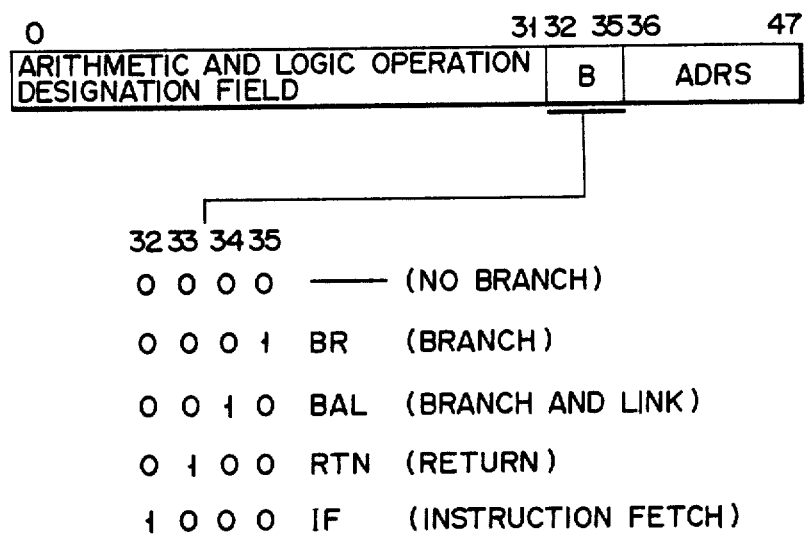

MICROPROGRAM CONTROL CIRCUIT

BACKGROUND OF THE INVENTION

This invention relates to a microprogram control circuit, which controls the setting of a return address used to exit from a subroutine in order to return to a desired point in a main program, when a return instruction included in a microprogram is executed.

A typical microprogram control circuit for use in a computer, a control device, etc., which employs a microprogram control system, performs various control functions according to micro instructions latched from a control storage. When a micro instruction, BAL (Branch And Link), is latched from the control storage, a return address to return to a main program (i.e., the next address to that where the BAL instruction is located in the main program) is latched into a stack register, and branching to a subroutine, whose start address is the branch address set in the address field of the BAL instruction, is executed. The last micro instruction of this subroutine is RTN (Return). When this RTN instruction is read out from the control storage, the return address held in the stack register is latched out, causing the program sequence to return to the particular point in the main program which is designated by that return address.

FIG. 1 illustrates an example of two types of microprograms A and B. Microprogram A consists of program blocks A1, S1, S2, S3, A2, and A3, while microprogram B consists of program blocks B1, S1, S2, S3, B2, and B3. As should be clear from this drawing, programs A and B have a common program section 10 (dotted region) that consists of blocks S1, S2, and S3. Accordingly, implementing common program section 10 as a subroutine can reduce the overall amount of program code, as well as the total number of individual programs.

However, the return address to return from common program section 10 to program A or B varies depending on whether the control returns from block S2 or block S3. According the prior art technique, therefore, the entire common program section 10 cannot be implemented as a single subroutine, thereby simply leaving a choice of either using programs A and B of FIG. 1 individually as they are, or of forming a subroutine only for block S1 (see FIG. 2), which has a single return address. Consequently, known microprogram control circuits require a larger size of, and thus more complicated, microprograms.

SUMMARY OF THE INVENTION

It is an object of the present invention to provide a microprogram control circuit capable of ensuring that a microprogram having more than one return address can be incorporated into a subroutine.

To achieve this object, the microprogram control circuit of the present invention is designed to comprise a stack register for storing a return address to return from a subroutine, branching to which is performed when a branch and link instruction is executed; a control storage for storing a group of micro instructions including a return instruction having an addend-data field into which addend data, to be added to the return address stored in the stack resister is set; an adder for adding the contents of the addend-data field of the return instruction, to the return address stored in the stack register, when the return instruction is read out from the control storage; and selection means for selectively fetching, to the control storage, the result of the addition performed by the adder, as an address for specifying the next micro instruction to be executed.

With this arrangement, therefore, it is possible to form a subroutine even for a microprogram which has more than one return address, which cannot be incorporated into a subroutine according to the prior art technique. Moreover, because this invention can set any desired return address, a higher level program involving various return addresses can be executed.

BRIEF DESCRIPTION OF THE DRAWINGS

Other objects and features of the present invention will be apparent from the following description taken in conjunction with the accompanying drawings, in which:

FIG. 4 is a format chart for micro instructions used in the circuit of FIG. 3.

DETAILED DESCRIPTION OF PREFERRED EMBODIMENT

Figure 3:
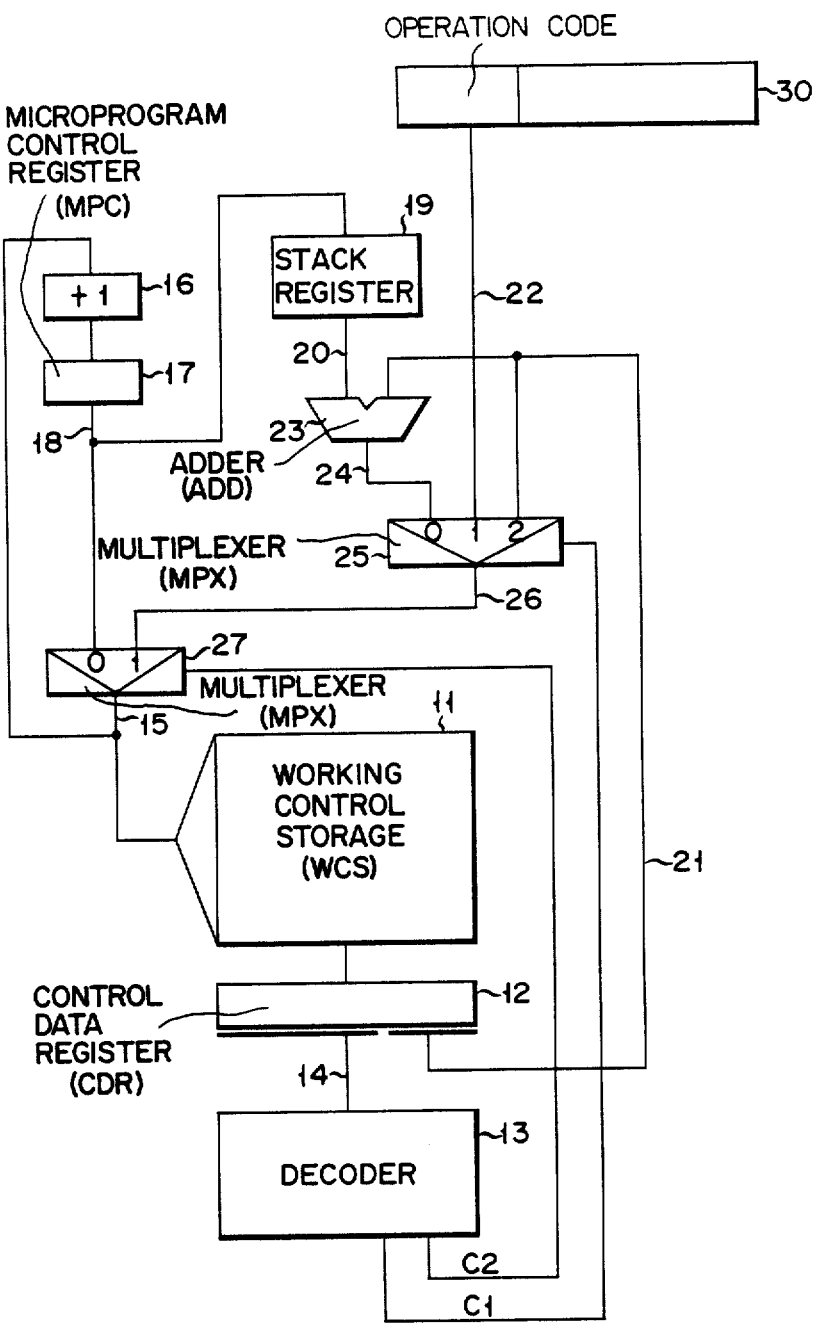
FIG. 3 is a block diagram of a microprogram control circuit according to an embodiment of the present invention.

FIG. 3 is a block diagram showing a microprogram control circuit embodying the present invention. Here, a group of micro instructions are stored in a working control storage (WCS) 11. A micro instruction read out from WCS 11 is latched into a control data register (CDR) 12. The contents of predetermined fields (an arithmetic and logic operation designation field and a B field, to be described later) of the micro instruction in CDR 12 are supplied over a data line 14 to a decoder 13, where they are then decoded. WCS 11 receives an address via an address data line 15. The address data on line 15 is incremented by one in a +1 circuit 16, and is then latched into a microprogram control register (MPC) 17. The output of MPC 17 is supplied, over an address data line 18, to a stack register 19 and a multiplexer (MPX) 27.

Stack register 19 holds an address (a return address to return to a main program from a subroutine) present on address data line 18 when a BAL instruction is executed. The output of stack register 19 is supplied, over an address data line 20, to an adder (ADD) 23. The content of a predetermined field (an ADRS (address) field) of CDR 12 is supplied, over an address data line 21, to ADD 23, which then adds together the data on address data lines 20 and 21. The output of ADD 23 is supplied, over an address data line 24, to a multiplexer (MPX) 25.

MPX 25 receives the address data from ADD 23 and an address on address data line 22, which is used to transfer an address that is supplied from an external unit (e.g., an OP code section of a micro instruction register 30) upon execution, for example, of an instruction fetch (IF) MPX 25 also receives a predetermined field (the ADRS field) of CDR 12. MPX 25 selects one of its three inputs (0, 1, and 2), respectively coupled to address data lines 24, 22, and 21, in accordance with a 2-bit control signal C1. Control signal C1, which is one of the output signals of decoder 13, is 0 ("00") when the B field of a micro instruction indicates RTN, is 1 ("01") when the B field indicates IF, and is 2 ("10") otherwise. The output of a multiplexer (MPX)25 is fetched, over an address data line 26, to MPX 27, which selects one of two inputs (0 and 1) supplied via address data lines 18 and 26, in accordance with a 1-bit control signal C2. Control signal C2, which is also one of the output signals of decoder 13, is 0 when the B field in a micro instruction is "0000", which indicates "no branch", and is 1 otherwise (i.e., the B field indicates "a branch", "a branch and link", etc.). The output of MPX 27 is supplied, over address data line 15, to WCS 11 and +1 circuit 16.

FIG. 4 shows the format of the aforementioned micro instruction, which has a 32-bit arithmetic and logic operation designation field, a 4-bit B (branch) field and a 12-bit ADRS (address) field. The B field indicates no branch when it is "0000" and indicates BR (Branch) when it is "0001." Further, the B field respectively indicates BAL (Branch and Link), RTN (Return), and IF (Instruction Fetch), when it is "0010", "0100", and "1000.". The ADRS field of the micro instruction specifies data to be added to the return address to a main program, when the B field indicates RTN.

Figure 1:
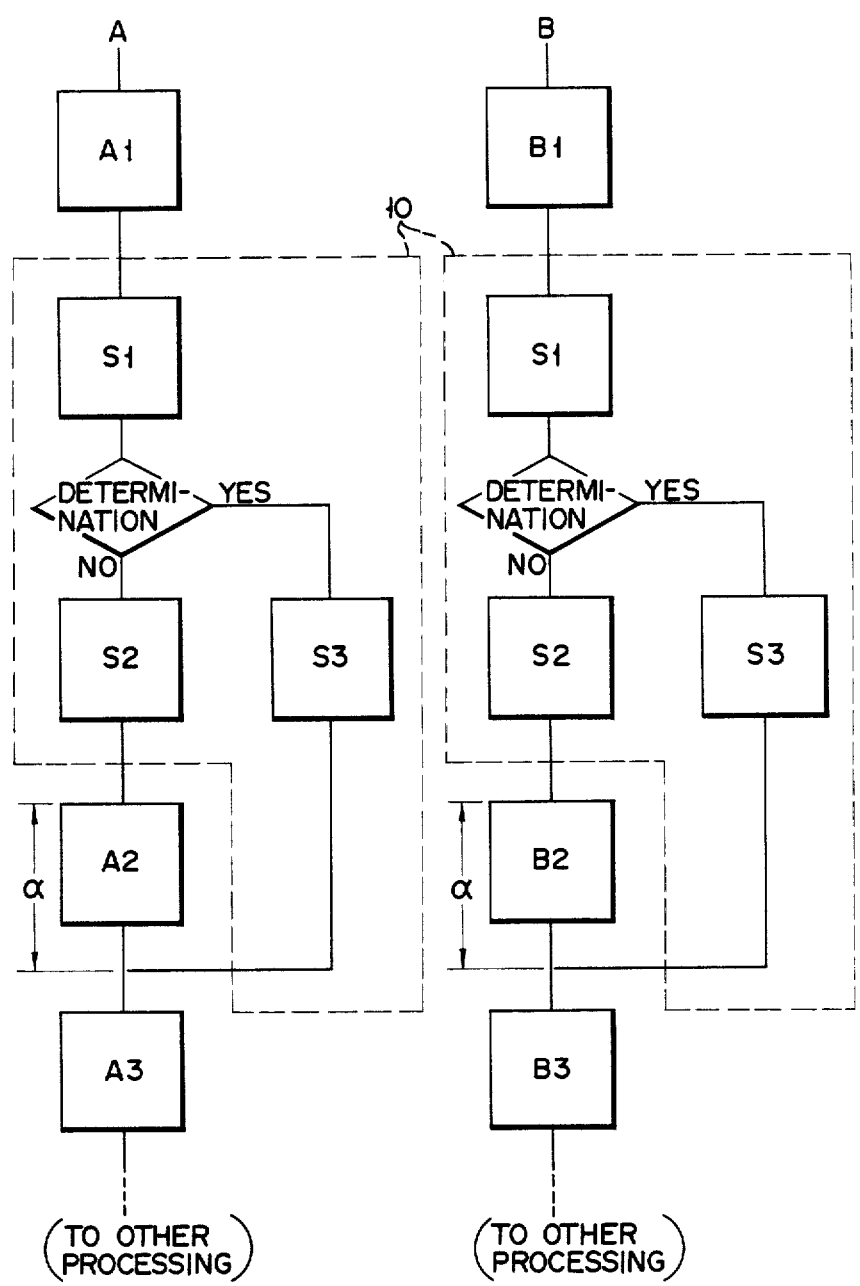
FIG. 1 is a diagram of typical microprograms, no part of which is incorporated into a subroutine.
Figure 2:
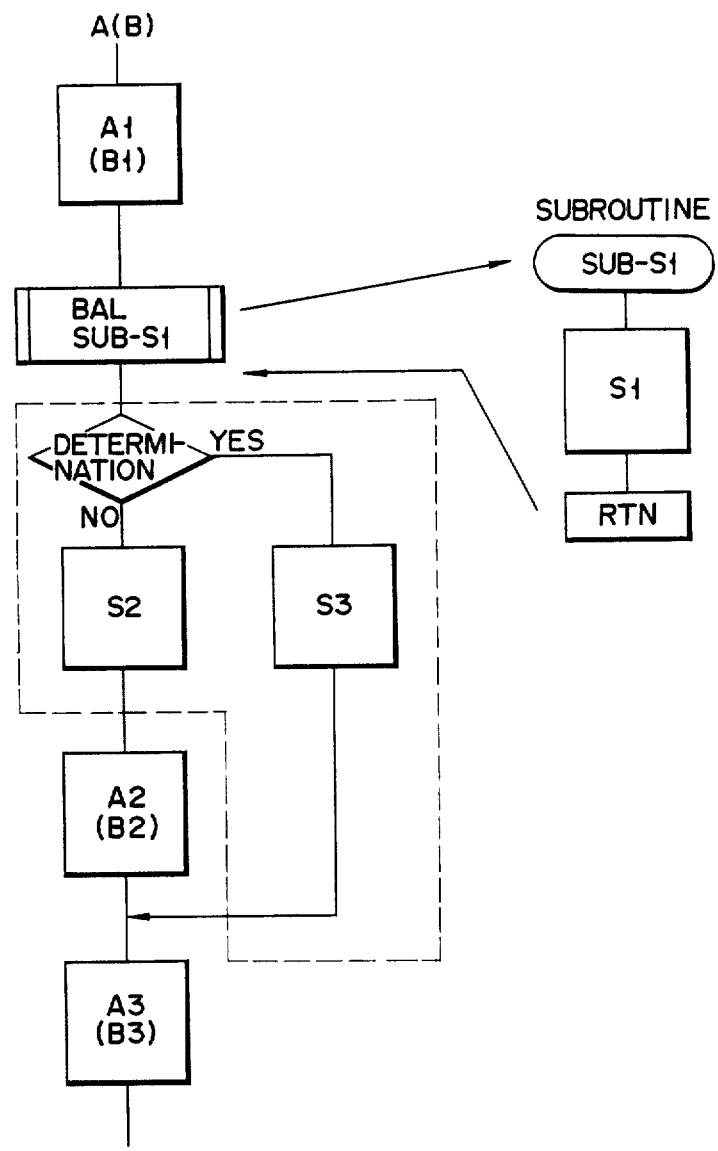
FIG. 2 is a diagram of the microprograms of FIG. 1, after part of the microprograms is incorporated into a subroutine, according to a conventional technique.
Figure 5:
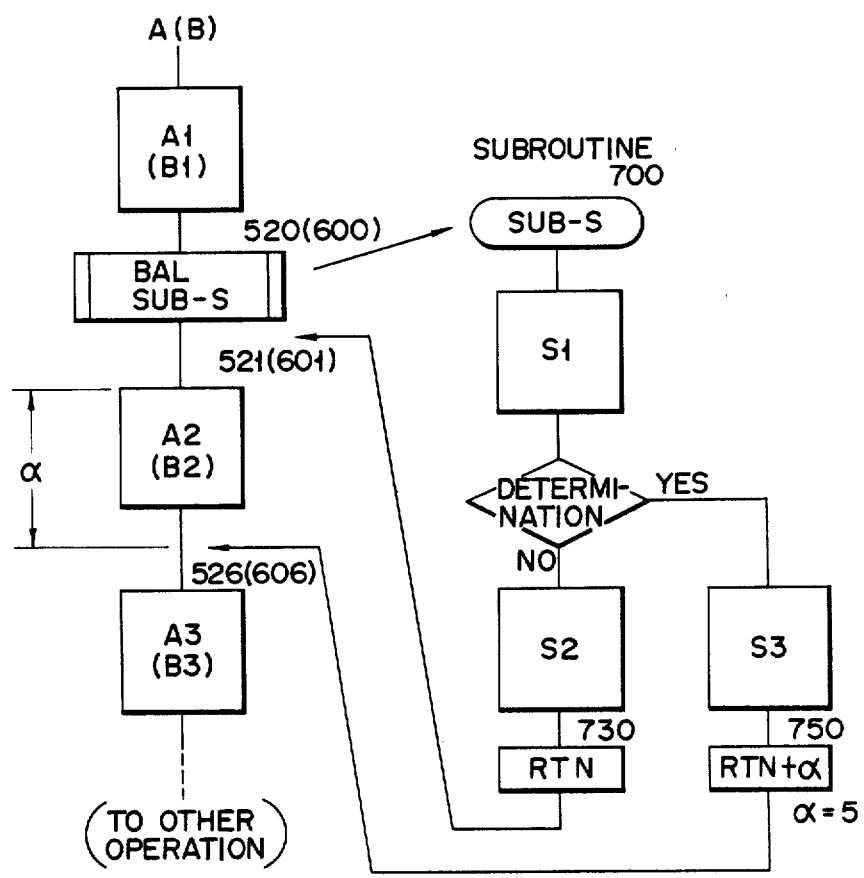
FIG. 5 is a diagram of a microprogram that includes a subroutine formed using the microprogram control circuit of the present invention.

The operation of the embodiment of the present invention will now be explained, with reference to the microprogram exemplified in FIG. 5. In this microprogram, program section 10, common to both programs A and B of FIG. 1, is implemented as a subroutine, SUB-S. The numeral situated above the upper right-hand corner of each program block in FIG. 5 represents the address in WCS 11 where the first micro instruction of that of program A is located. Each numeral in parentheses in FIG. 5 represents the address in WCS 11 where the first micro instruction of the corresponding block of program B is located, but, for the sake of simplicity, the operation of the embodiment will be explained using only the addresses for program A.

Provided that program block A1 of program A is completed and a BAL instruction, specifying a branch and link to subroutine SUBS, is fetched into CDR 12 from the address 520 of WCS 11, the address (520) on address data line 15 is incremented by one, in +1 circuit 16, and the incremented result (i.e., 521) is loaded into MPC 17. The content of the ADRS field of the micro instruction (BAL instruction) latched into CDR 12, i.e., the branch address indicating the start address 700 of subroutine SUB-S, is supplied, over address data line 21, to input 2 of MPX 25 and to ADD 23. The contents of the arithmetic and logic operation designation field and the B field are supplied, over data line 14, to decoder 13, for decoding. When the content of the B field specifies BAL, decoder 13 produces control signal C1 (C1=2), to select input 2 of MPX 25, and control signal C2 (C2=1), to select input 1 of MPX 27.

As control signal C1 from decoder 13 is 2 ("10"), MPX 25 selects its input 2, that is, MPX 25 selects the address (branch address) on address data line 21. This address is supplied, over address data line 26, to MPX 27. MPX 27 selects its input 1, as control signal C2 from decoder 13 is 1. Consequently, MPX 27 receives the address (branch address) on address data line 26, and sends it onto address data line 15. The address on address data line 15 specifies the next micro instruction to be executed (the leading micro instruction of subroutine SUB-S, in this example). At this time, the address (i.e., 521) loaded in MPC 17 is stacked into stack register 19, as a return address from the BAL operation, by means of a control signal (not shown).

When the address on address data line 15 specifies the leading micro instruction of subroutine SUB-S, this subroutine is executed from program block S1. If the decision made in the subsequent block is NO, program block S2 is executed. The micro instruction set at the last location (address 730) of block S2 is a RTN instruction. Provided that this RTN instruction is latched into CDR 12 from WCS 11, the content of the ADRS field of the instruction, which is 0 in this example, is supplied, over address data line 21, to one input of ADD 23 and input 2 of MPX 25. The return address (521) to the main program, stored in stack register 19 is supplied to the other input of ADD 23, through address data line 20. ADD 23 adds together the data on address data lines 20 and 21, and outputs the result on address data line 24. The data on address data line 24, which coincides with that (521) on address data line 20, in this example, is sent to input 0 of MPX 25.

As it is the RTN instruction which is latched into CDR 12 this time, decoder 13 now produces control signal C1 (C1=0), to select input 0 of MPX 25, and control signal C2 (C2=1), to select input 1 of MPX 27. Consequently, the data (521) on address data line 24, i.e., the addition result obtained by ADD 23, is supplied onto address data line 15 via MPX 25, address data line 26, and MPX 27, thus specifying the next executed micro instruction (the leading micro instruction of program block A2 of the main program). The above explains an ordinary return operation.

If the decision made in the determination block following program block S1 is YES, then program block S3 is executed. As in the case of block S2, a RTN instruction is set at the last location (address 750) of block S3. This RTN instruction, unlike the ordinary RTN instruction to return to address 521 (the leading address of program block A2), causes the program sequence to return to address 526 (the leading address of program block A3 subsequent to A2). For this reason, the difference $\alpha$ ($\alpha=5$) between these two addresses 521 and 526 is preset in the ADRS field of the RTN instruction at address 750.

Provided that this particular RTN instruction is latched into CDR 12 from WCS 11, the contents (5) of the ADRS field of the instruction is supplied, over address data line 21, to one input of ADD 23 and to input 2 of MPX 25. The return address (521) to the main program stacked in stack register 19 is supplied, over address data line 20, to the other input of ADD 23. ADD 23 adds together the data on address data lines 20 and 21, and sends the resultant data (526) onto address data line 24. This data on address data line 24 is supplied to input 0 of MPX 25.

As what is latched into CDR 12 is the RTN instruction, MPX 25 selects its input 0, while MPX 27 selects its input 1. Consequently, the addition result obtained in ADD 23, which is the data (526) on address data line 24, is supplied onto address data line 15 via MPX 25, address data line 26, and MPX 27, in order to specify the next executed micro instruction (the leading micro instruction of program block A3 of the main program).

The aforementioned embodiment has been explained with regard to a subroutine which has two different return addresses to return to the main program. This embodiment, however, can of course apply, without difficulty, to a subroutine having more than two return addresses. In addition, presetting a negative value in the ADRS field of a RTN instruction (a micro instruction specifying RTN) can ensure returning to any point, in the main program, which precedes the BAL instruction.

What is claimed is:

1. A microprogram control circuit, executing ones of a series of microinstructions, and comprising:
   microinstruction storing means for storing the microinstructions including a return instruction having an offset designating field for designating an offset value from a return address in a pair program, one of the microinstructions being an executing microinstructions;
   return address storing means for storing the return address in the main program, in response to a branch instruction in the main program;
   adding means, connected to said return address storing means and said microinstruction storing means, for adding the offset value designated in the offset designating field and the return address stored in said return address storing means yielding an addition result, and for outputting the addition result, when the executing microinstruction in said microinstruction storing means is the return instruction; and
   address supplying means, connected to said adding means and said microinstruction storing means, for supplying the addition result from said adding means to said microinstruction storing means, said addition result designating the one microinstruction in the series of microinstructions to be executed next.

2. A microprogram control circuit according to claim 1 wherein said series of microinstructions includes a branch instruction and an instruction following the branch instruction, and wherein said address supplying means is a selector means for supplying the addition result from said adding means to said microinstruction storing means, said addition result designating the one microinstruction in the series of microinstructions to be executed next, when the executing microinstruction in said microinstruction storing means is the branch instruction, and for supplying an address designating an instruction following the branch instruction to said microinstruction storing means, when the executing microinstruction in said microinstruction storing means is other than the branch instruction.

3. A microprogram control circuit according to claim 1, wherein microinstructions are fetched and wherein at least the branch instruction has an address designation field designating an address in the microinstruction storing means, said microprogram control circuit further comprising address selecting means connected to said adding means, an external address source, and said microinstruction storing means, for supplying the addition result from said adding means to said microinstruction storing means, when the executing microinstruction in the microinstruction storing means is the return instruction, for supplying to said microinstruction storing means an address from the external address source, when the microinstruction is fetched, for selectively supplying the address designated in the address designation field of the executing microinstruction to said microinstruction storing means, when the executing microinstruction in the microinstruction storing means is the branch instruction, and for selectively supplying the address designation field in the microinstruction storing means when the microinstruction is not fetched.

* * * * *

UNITED STATES PATENT AND TRADEMARK OFFICE
CERTIFICATE OF CORRECTION

PATENT NO. : 4,799,151

DATED : January 17, 1989

INVENTOR(S) : Toshio IWAO

It is certified that error appears in the above-identified patent and that said Letters Patent is hereby corrected as shown below:

Claim 1, column 5, line 15, change "address in a pair program..." to --address in a main program...--.

Signed and Sealed this

Twenty-second Day of May, 1990

Attest:

HARRY F. MANBECK, JR.

Attesting Officer

Commissioner of Patents and Trademarks